United States Patent
Malladi et al.

(10) Patent No.: US 9,705,647 B2
(45) Date of Patent: *Jul. 11, 2017

(54) INTER-UE INTERFERENCE CANCELLATION

(71) Applicant: QUALCOMM Incorporated, San Diego, CA (US)

(72) Inventors: Durga Prasad Malladi, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,468

(22) Filed: Nov. 28, 2016

(65) Prior Publication Data

US 2017/0078055 A1   Mar. 16, 2017

Related U.S. Application Data

(63) Continuation of application No. 13/943,716, filed on Jul. 16, 2013, now Pat. No. 9,544,082.

(60) Provisional application No. 61/679,654, filed on Aug. 3, 2012.

(51) Int. Cl.
| | |
|---|---|
| *H04L 5/00* | (2006.01) |
| *H04J 11/00* | (2006.01) |
| *H04B 1/7097* | (2011.01) |
| *H04W 72/08* | (2009.01) |
| *H04L 5/14* | (2006.01) |
| *H04W 72/04* | (2009.01) |

(52) U.S. Cl.
CPC ......... *H04L 5/0032* (2013.01); *H04B 1/7097* (2013.01); *H04J 11/005* (2013.01); *H04J 11/0023* (2013.01); *H04J 11/0059* (2013.01); *H04L 5/14* (2013.01); *H04W 72/048* (2013.01); *H04W 72/0446* (2013.01); *H04W 72/082* (2013.01)

(58) Field of Classification Search
None
See application file for complete search history.

(56) References Cited

U.S. PATENT DOCUMENTS

| | | |
|---|---|---|
| 8,270,435 B2 | 9/2012 | Olszewski |
| 8,400,998 B2 | 3/2013 | Kuchibhotla et al. |
| 9,319,130 B2 * | 4/2016 | Parkvall |

(Continued)

FOREIGN PATENT DOCUMENTS

| | | |
|---|---|---|
| CN | 102256365 A | 11/2011 |
| CN | 102387554 A | 3/2012 |

(Continued)

OTHER PUBLICATIONS

International Search Report and Written Opinion—PCT/US2013/051030—ISA/EPO—Jan. 29, 2014.

*Primary Examiner* — Faruk Hamza
*Assistant Examiner* — Thinh Tran
(74) *Attorney, Agent, or Firm* — Ashish L. Patel

(57) ABSTRACT

Interference cancellation occurs for devices, where the source of the interference is another UE. The victim UE receiver identifies subframes vulnerable to potential interference from other UEs. Candidate resource blocks in the identified vulnerable subframes are listed. Interference is cancelled for edge resource blocks and valid contiguous resource blocks.

16 Claims, 11 Drawing Sheets

(56) References Cited

U.S. PATENT DOCUMENTS

| | | | |
|---|---|---|---|
| 2008/0130519 A1 | 6/2008 | Bahl et al. | |
| 2010/0177721 A1* | 7/2010 | Simonsson | H04J 11/005 370/329 |
| 2010/0317364 A1* | 12/2010 | Zhang | H04W 16/04 455/452.2 |
| 2010/0329199 A1 | 12/2010 | Liu et al. | |
| 2011/0116532 A1 | 5/2011 | Nentwig | |
| 2011/0141971 A1 | 6/2011 | Zhang et al. | |
| 2012/0157082 A1 | 6/2012 | Pedersen et al. | |
| 2012/0202546 A1 | 8/2012 | Nakayama | |
| 2013/0114496 A1* | 5/2013 | Mazzarese | H04L 5/0023 370/312 |
| 2013/0215785 A1 | 8/2013 | Jung et al. | |
| 2013/0294268 A1* | 11/2013 | Xu | H04W 72/082 370/252 |
| 2014/0036801 A1 | 2/2014 | Malladi et al. | |
| 2014/0328309 A1* | 11/2014 | Comstock | H04W 72/082 370/329 |
| 2015/0049693 A1* | 2/2015 | Seo | H04L 5/0032 370/329 |

FOREIGN PATENT DOCUMENTS

| | | |
|---|---|---|
| CN | 102484572 A | 5/2012 |
| WO | 2010148131 A1 | 12/2010 |
| WO | 2011055943 A2 | 5/2011 |
| WO | 2011103475 A1 | 8/2011 |
| WO | 2011103476 A1 | 8/2011 |

* cited by examiner

| Cell A 710-1 | D | S | U | U | D | D | S | U | U | D |
|---|---|---|---|---|---|---|---|---|---|---|
| subframe number | 0 | 1 | 2 | 3 | 4 | 5 | 6 | 7 | 8 | 9 |
| Cell B 710-2 | D | S | U | U | U | D | D | D | D | D |

INTER-UE INTERFERENCE CANCELLATION

CROSS-REFERENCE TO RELATED APPLICATIONS

This application is a continuation of U.S. patent application Ser. No. 13/943,716, entitled "INTER-UE INTERFERENCE CANCELLATION," filed on Jul. 16, 2013, which claims the benefit under 35 U.S.C. §119(e) to U.S. Provisional Patent Application No. 61/679,654, entitled "INTER-UE INTERFERENCE CANCELLATION," filed on Aug. 3, 2012, the disclosures of which are expressly incorporated by reference herein in their entireties.

BACKGROUND

Field

Aspects of the present disclosure relate generally to wireless communication systems, and more particularly to interference cancellation for devices experiencing interference from another device, such as another UE.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Various aspects of the present disclosure are directed to interference cancellation for devices, where the source of the interference is another UE. The victim UE identifies subframes vulnerable to potential interference from other UEs. Candidate resource blocks in the identified vulnerable subframes are listed. Interference is cancelled for edge resource blocks and valid contiguous resource blocks.

In one aspect, a method of wireless communication is disclosed. The method includes reading system information from a neighboring cell to identify a neighboring time domain resource allocation. At least one candidate resource is identified based on a comparison of the neighboring time domain resource allocation and a serving cell time domain resource allocation. At least one interfered resource is also identified by detecting uplink interference on one or more resource, from the at least one candidate resource, based on a criteria. Interference cancellation is performed on the at least one interfered resource.

Another aspect discloses wireless communication having a memory and at least one processor coupled to the memory. The processor(s) is configured to read system information from a neighboring cell to identify a neighboring time domain resource allocation. The processor(s) is also configured to identify at least one candidate resource based on a comparison of the neighboring time domain resource allocation and a serving cell time domain resource allocation. The processor(s) is further configured to identify at least one interfered resource by detecting uplink interference on one or more resource, from the at least one candidate resource, based on a criteria. Additionally, the processor(s) is configured to perform interference cancellation on the at least one interfered resource.

Another aspect discloses a computer program product for wireless communications in a wireless network having a non-transitory computer-readable medium. The computer-readable medium has non-transitory program code recorded thereon which, when executed by the processor(s), causes the processor(s) to perform operations of reading system information from a neighboring cell to identify a neighboring time domain resource allocation. The program code also causes the processor(s) to identify at least one candidate resource based on a comparison of the neighboring time domain resource allocation and a serving cell time domain resource allocation. Additionally, the program code causes the processor to identify at least one interfered resource by detecting uplink interference on one or more resource, from the at least one candidate resource, based on a criteria. Further, the program code also causes the processor(s) to perform interference cancellation on the at least one interfered resource.

In another aspect, an apparatus is disclosed that includes means for reading system information from a neighboring cell to identify a neighboring time domain resource allocation. The apparatus also includes means for identifying at least one candidate resource based on a comparison of the neighboring time domain resource allocation and a serving cell time domain resource allocation. The apparatus includes means for identifying at least one interfered resource by detecting uplink interference on one or more resource, from the at least one candidate resource, based on a criteria. Additionally, the apparatus includes means for performing interference cancellation on the at least one interfered resource.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
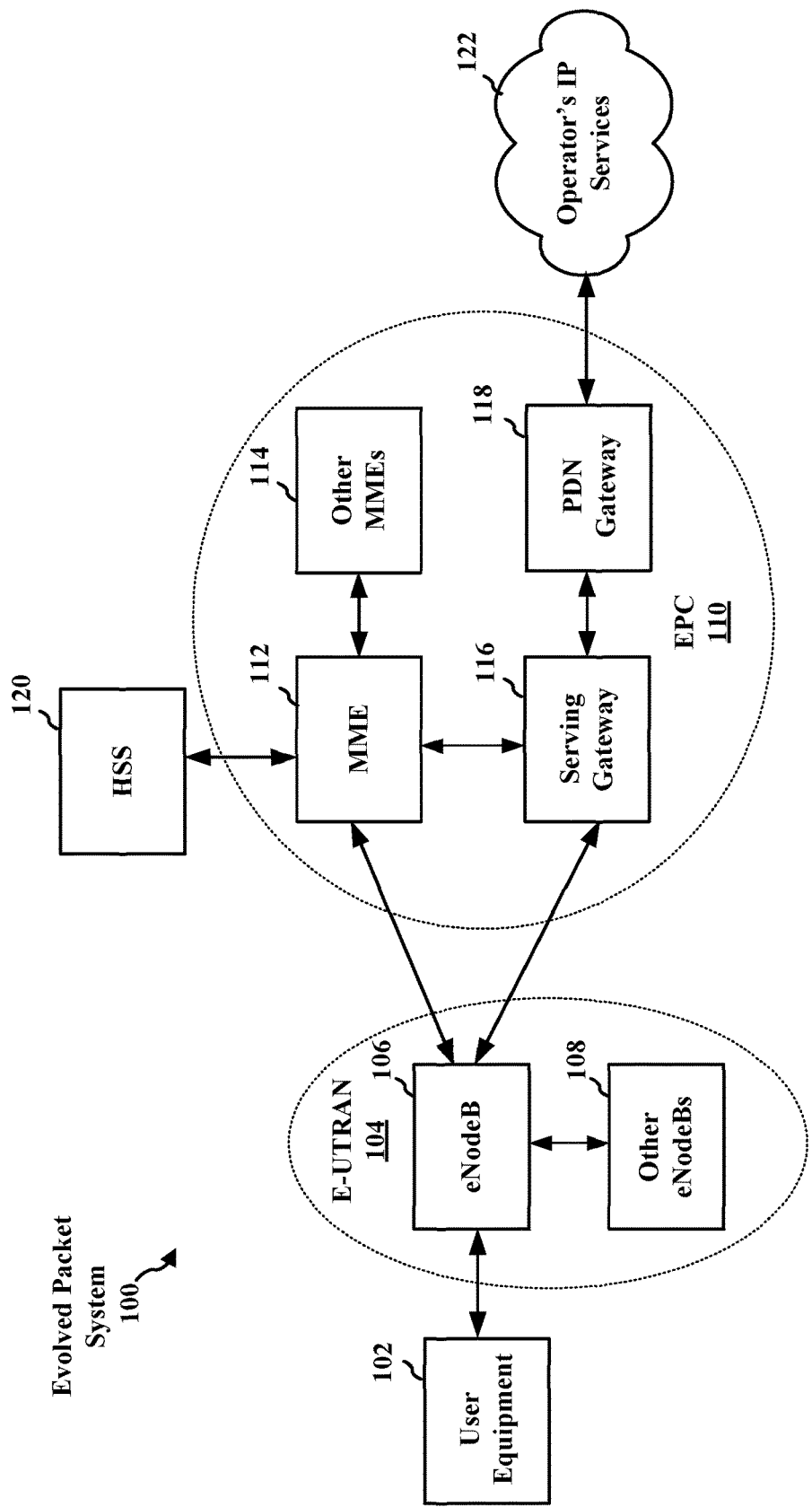
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
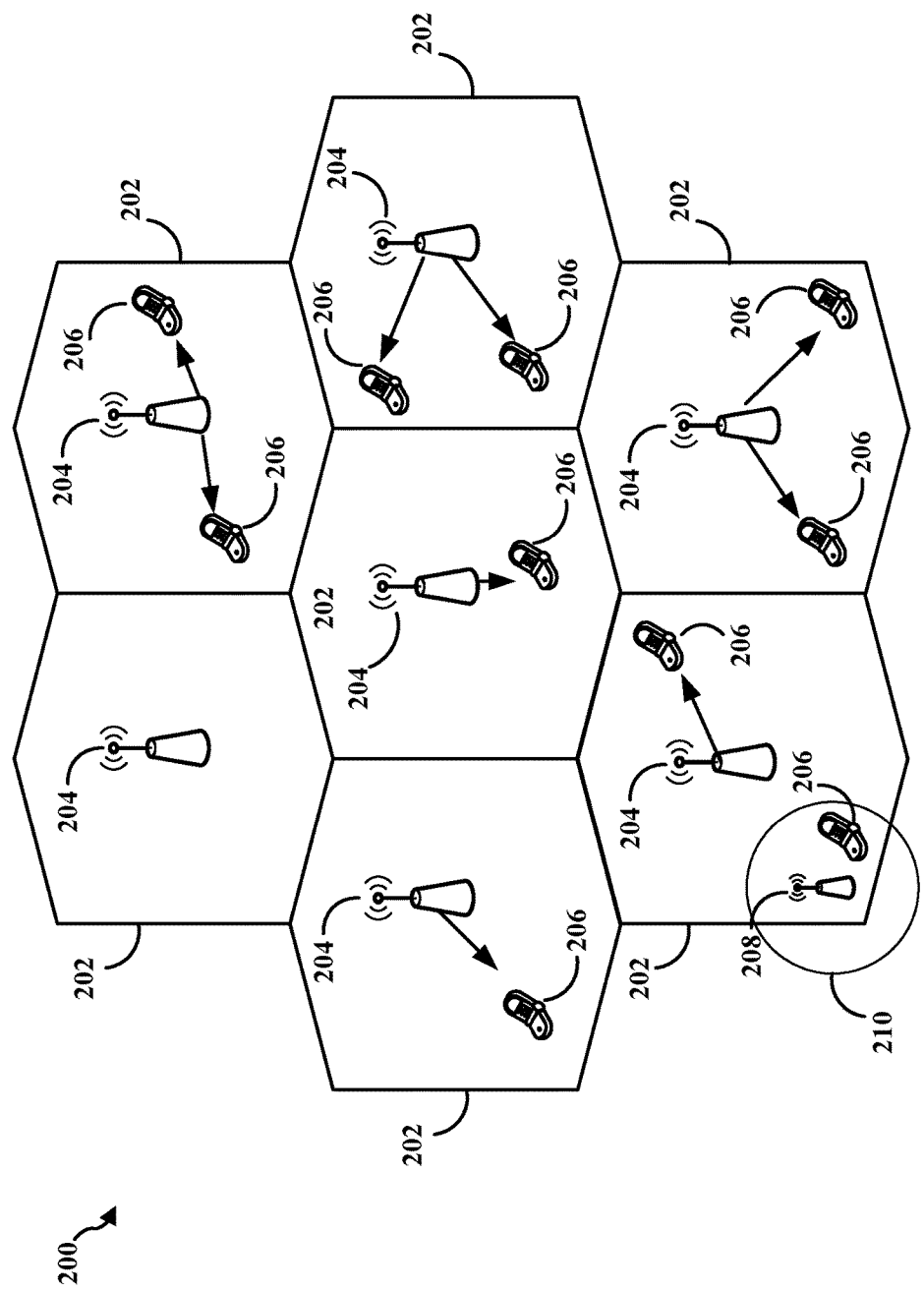
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
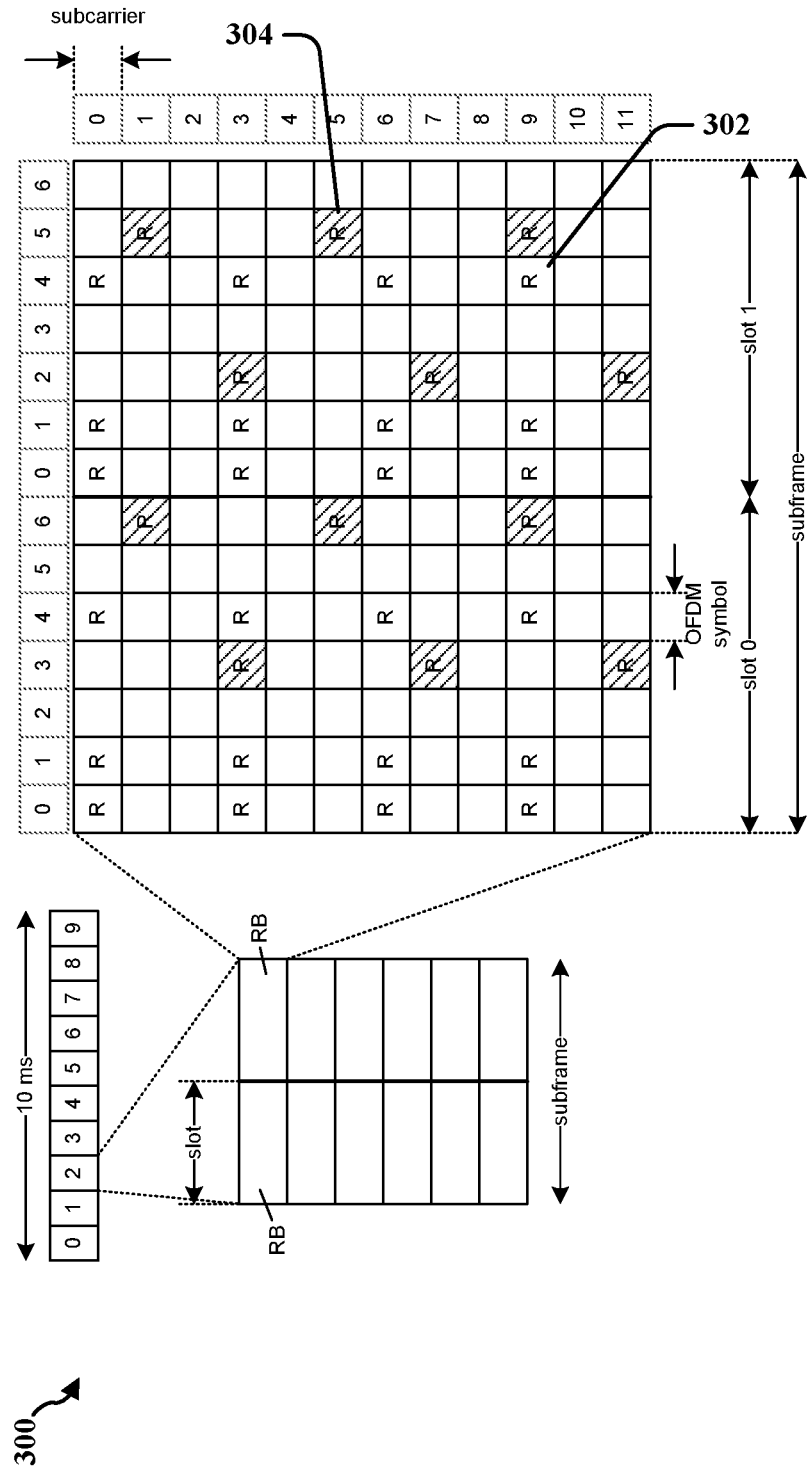
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
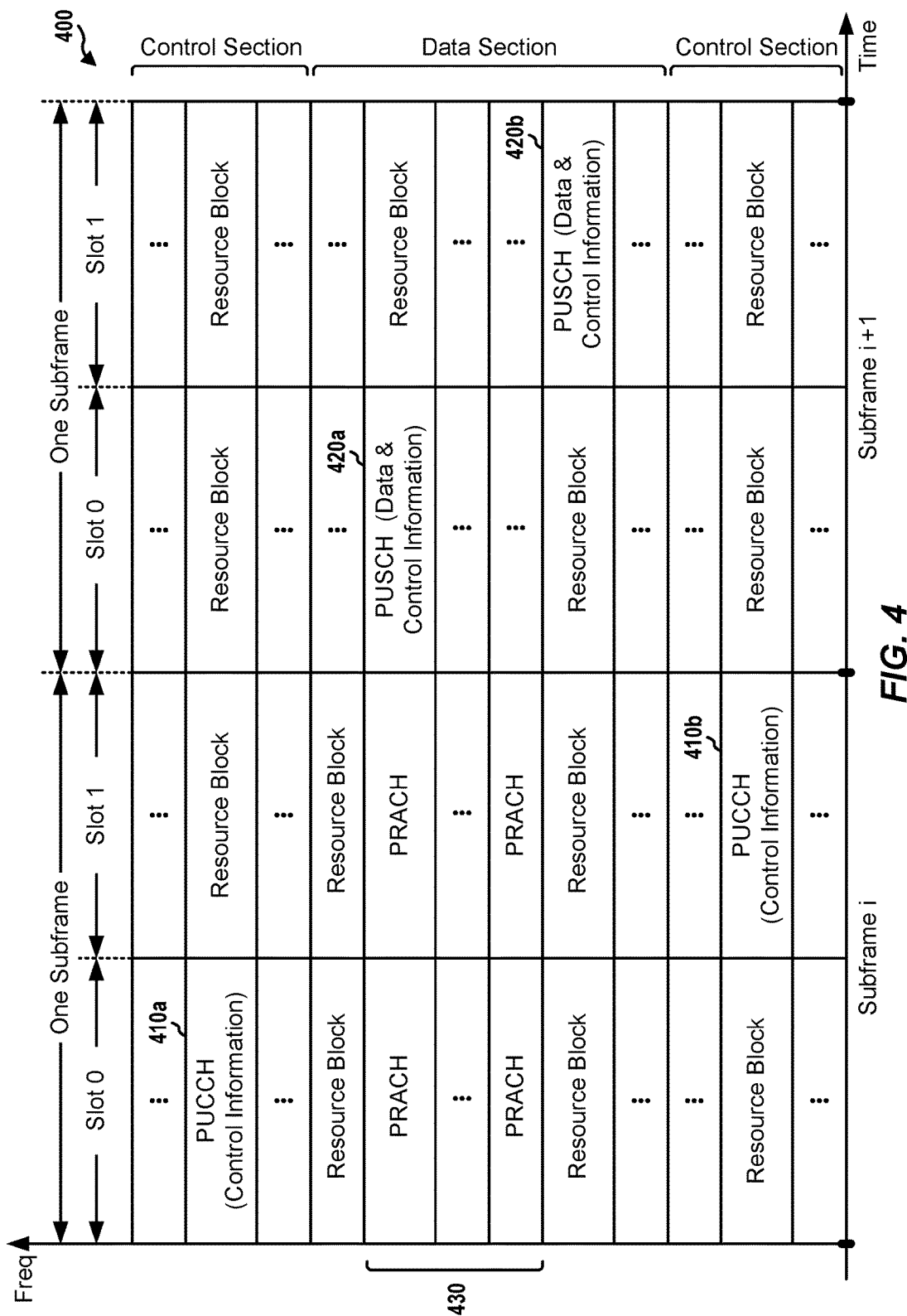
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
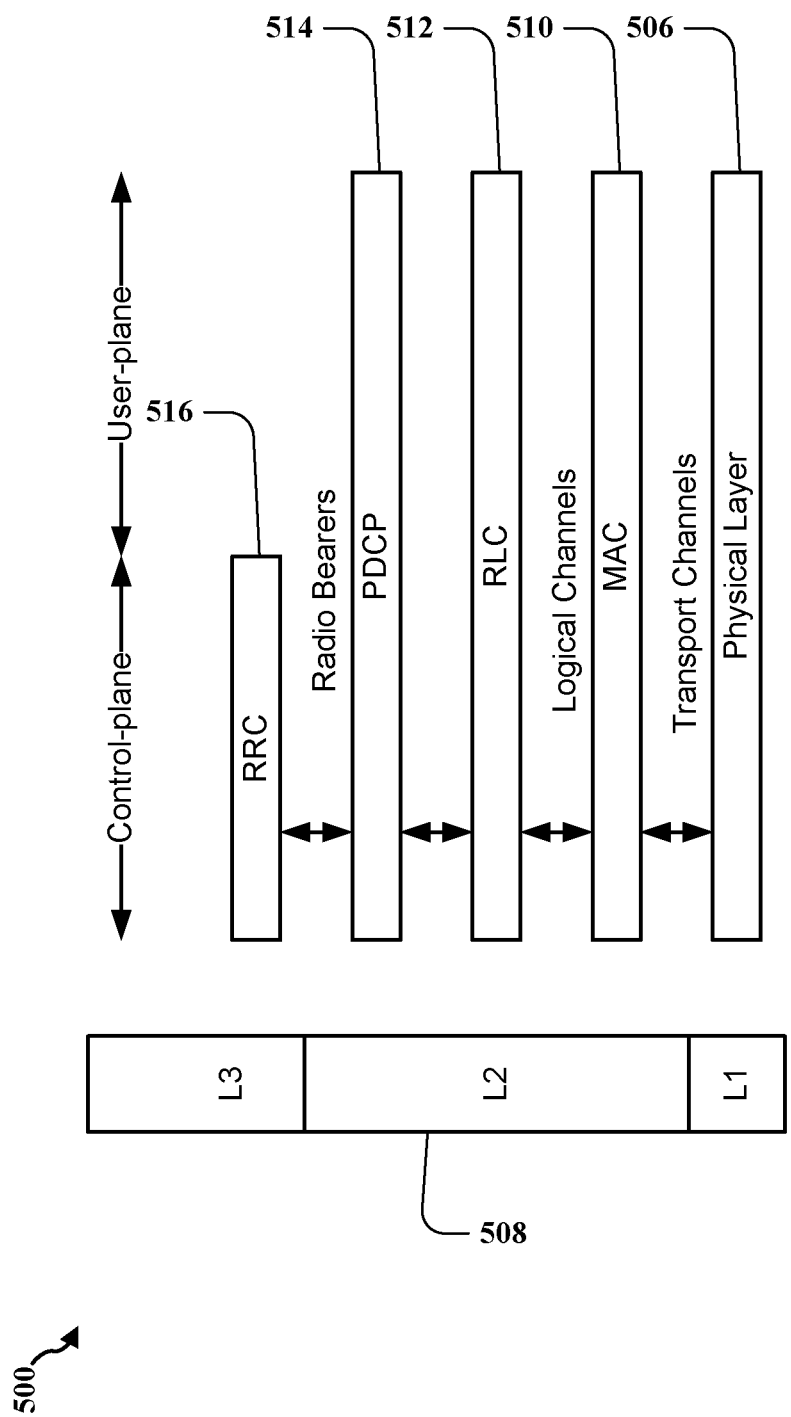
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
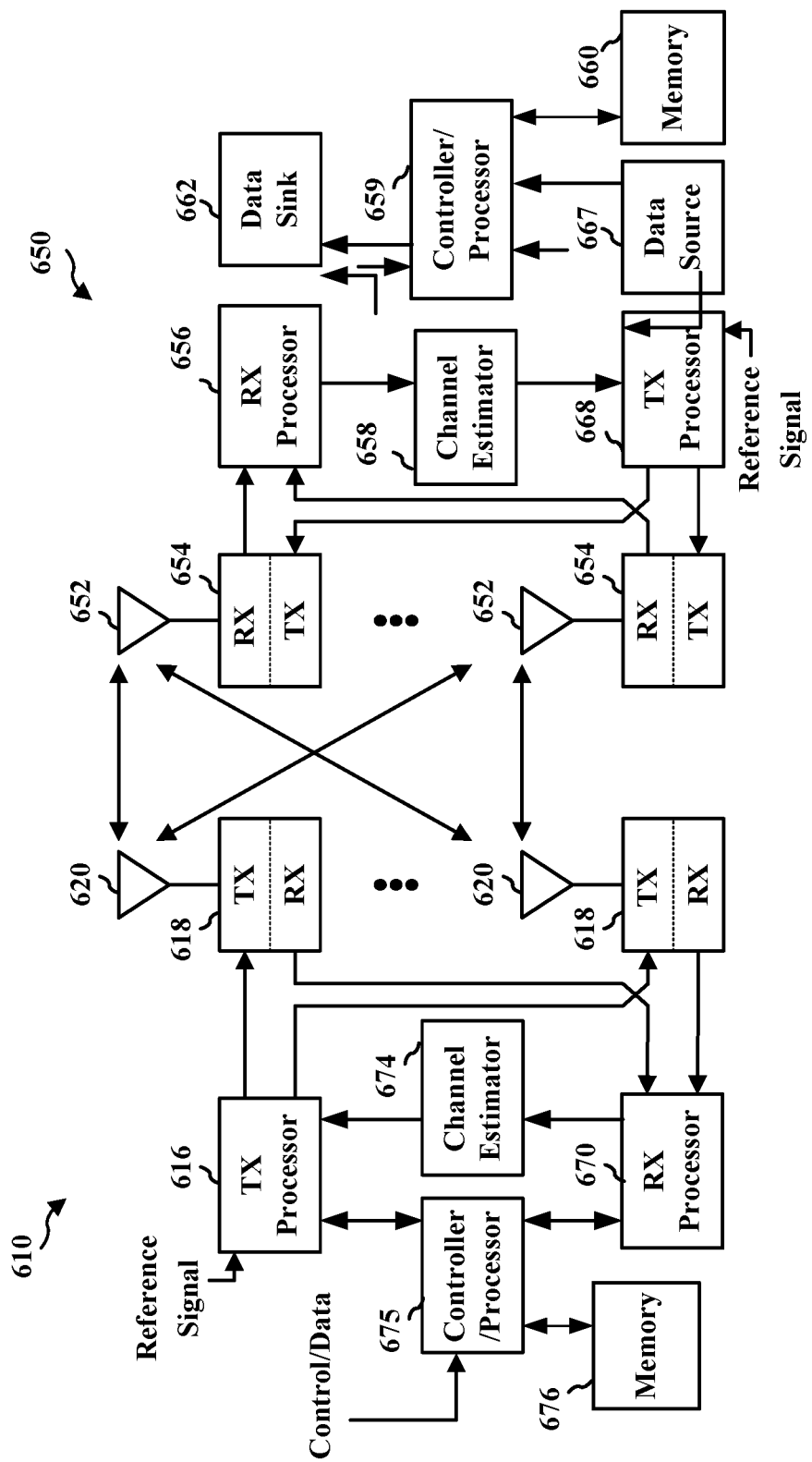
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Various aspects of the present disclosure are directed to interference cancellation for devices, where the source of the interference is another UE. One aspect is directed to TDD systems, which are classified by their usage of three types of subframes: downlink subframes (D), uplink subframes (U); and special subframes (S).

Figure 7:
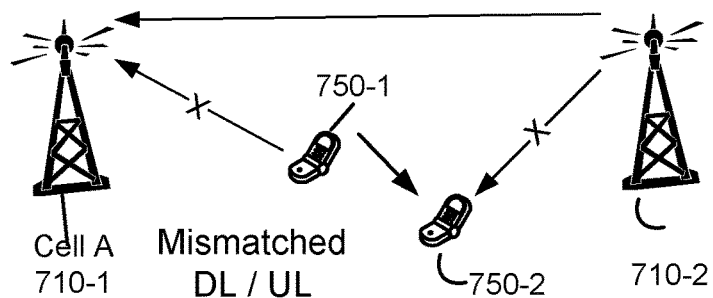
FIGS. 7-8 are block diagrams illustrating subframe traffic across various cells in a network.

FIG. 7 illustrates an example scenario of different subframe partitioning across two cells (i.e., cell A 710-1 and cell B 710-2). The traffic pattern of cell A 710-1 across 10 subframes is DSUUDDSUUD, where D represents downlink transmissions in a subframe, S represents special subframe transmissions in a subframe and U represents uplink transmissions in a subframe. The traffic pattern of cell B 710-2 across the same subframes in the same example is represented as: DSUUUDDDDD. A UE-A 750-1 communicates with the cell A 710-1 and a UE-B 750-2 communicates with the cell B 710-2. The subframes with potential significant interference at a victim UE receiver (Rx) are subframes 4, 7 and 8. In particular, on subframe 4, the aggressor UE-B is transmitting (U) while the victim UE-A is scheduled to receive (D). On subframes 7 and 9, the aggressor UE-A 750-1 is transmitting (U) while the victim UE-B 750-2 is receiving (D) on the same subframes. This interference may occur on cell boundaries between different carriers or on adjacent channels.

Another aspect is directed to interference caused by UEs in FDD or TDD systems. For subframe partitioning in uplink communications, "W" indicates uplink transmissions of a wide area network (WAN) subframe (UE eNodeB) and "D" indicates uplink device-to-device (D2D) subframe (UE-UE) transmissions. Due to the distance, the W transmissions are high power transmissions.

Figure 8:
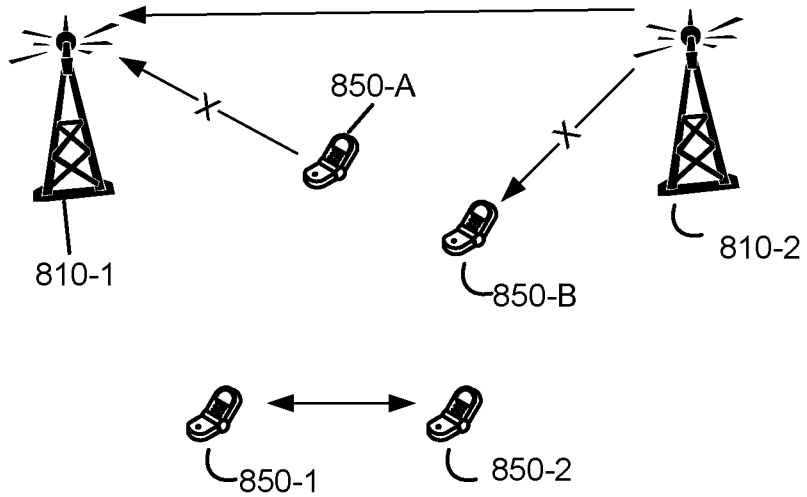

FIG. 8 illustrates an example scenario of different subframe partitioning across cell A 810-1 and cell B 810-2. The traffic pattern across cell A 810-1 is WDWWWDDD where a UE 850-A transmits to the cell A 810-1 on W subframes. The UEs 850-1 and 850-2 communicate with each other on D subframes. The traffic pattern across cell B 810-2 is WDDDWDWW. The UE 850-B transmits to cell B 810-2 on W subframes. The UEs 850-1 and 850-2 communicate with each other on D subframes. There is potential significant interference at a victim UE receiver (Rx) on subframes 2, 3, 6 and 7. In particular, on subframes 2 and 3, the aggressor UE 850-A is transmitting to the cell A 810-1(W) and the victims UE 850-1 and UE 850-2 are communicating with each other on those same subframes. In subframes 6 and 7, the aggressor UE 850-B is transmitting to the cell B 810-2 (W) while the victims UE 850-1 and UE 850-2 are communicating with each other (D) on those same subframes.

One aspect of the present disclosure is directed to reducing interference for a victim UE receiver. In particular, each UE identifies the subframes vulnerable to potential interference from other UEs. This may be accomplished by each UE reading the general network configuration of neighbors. For example the UE can read the neighbor cell and/or channel master and system information blocks (MIB and SIB). The UEs already have this information for handover purposes, but can be configured to also read this information for the purpose of determining potential interference. The UEs can also acquire additional information such as the cyclic prefix (normal vs. extended), TDD downlink-uplink subframe partitioning, WAN-device to device (D2D) subframe partitioning, random access channel (e.g., PRACH) and control channel (e.g., PUCCH) parameters, etc.

A neighbor cell SIB refers to the case when the same operator operates on the same channel, but has different subframe partitioning. A neighbor channel SIB refers to when a different operator is on a different channel (frequency) and has different subframe partitioning. It is noted that typical interference emanates from adjacent channels.

After the UE identifies the vulnerable subframes, the interference may be cancelled from the UEs. The interference is not canceled all the time on all subframes, but rather is canceled only when appropriate. In particular, in one aspect of the present disclosure, interference cancellation is not performed for all identified subframes, but is instead performed for particular candidate subframes. A candidate subframe is identified as a subframe that has high likelihood of observing interference from other UEs, and/or is a subframe in which data is expected to be received from a serving cell or another D2D device.

The candidate subframes can be narrowed by detecting aggressor UE interference. The aggressor UE interference can be detected in a candidate subframe by blind detection mechanisms, such as energy or signal detection on traffic resource elements (REs); energy or signal detection on reference signal (RS aka pilot) REs, traffic-to-pilot ratio (TPR) estimation, and modulation and spatial rank estimation.

To improve cancellation efficiency, LTE uplink properties of the interfering signals that are being cancelled may be considered. In particular, the information contained in the resource blocks may be utilized to determine when/if to perform interference cancellation.

Additional information is considered to more efficiently cancel interference. For example, whether the data signals of the interfering signals are located in the inner resource blocks (RBs) is considered. Also, whether the data symbols are 5 or 6 for each 0.5 ms timeslot is considered. The modulation of the data symbols can be quadrature phase shift keying (QPSK), 16 quadrature amplitude modulation (QAM) or 64 QAM for each spatial layer and is a discrete Fourier transform (DFT) spread OFDM. Also considered is whether the reference signal symbols of the interfering signals are one for each timeslot. For example it can be determined whether extended Zadoff-Chu (EZC) sequences with frequency domain cyclic shifts, and/or Hadamard sequence spread in time domain across timeslots are present. Also considered is whether the interfering signals are from a single carrier waveform. That is, each UE's transmission may be in contiguous resource blocks. Exceptions may apply, however, with uplink carrier aggregation.

To improve the cancellation efficiency, it can be determined whether the control (e.g., PUCCH) signals and random access (e.g., PRACH) signals of the interfering signals are located on the edge resource blocks. The control data symbols are 4 for each 0.5 ms timeslot and are modulated EZC sequences with frequency domain cyclic shifts. The control reference symbols are 2 or 3 for each timeslot and are EZC sequences with frequency domain cyclic shifts and DFT spread in time domain.

Once the candidate subframes are identified, the interference may then be cancelled. The candidate resource blocks with interference in the candidate subframe(s) are identified based on energy/signal detection metrics. For illustrative purposes, in one example, resource blocks 0-7, 12-18 and 47-50 are identified as candidate resource blocks. Those skilled in the art will appreciate other resource blocks may be identified as candidates.

From the candidate resource blocks (i.e., 0-7, 12-18 and 47-50 in this example), the edge resource blocks may be selected for PUCCH/PRACH cancellation. The PRACH and PUCCH locations are known from the neighbor SIB. For example, the PRACH resource blocks 2-7 can be tagged for cancellation (selected out of the example of identified candidate resource blocks above). The PUCCH resource blocks 0-1, and 49-50 may then be tagged for cancellation.

For data (e.g., PUSCH) cancellation, valid contiguous resource blocks are selected. In one example, the number of contiguous resource blocks is a multiple of 2, 3 or 5. From the above example, resource blocks 12-18 are considered. These are 7 contiguous resource blocks, which is an invalid combination because 7 is not a multiple of 2, 3 or 5. Valid combinations include $\{2\}+\{3, 4, 5, 6, 7, 8\}$ or $\{2, 3\}+\{4, 5, 6, 7, 8\}$, etc. All valid combinations are tagged for cancellation. In the above example, resource blocks 47 and 48 are considered. Because the combination of resource blocks $\{47, 48\}$ is a valid combination, it is tagged for cancellation Once the resource blocks are identified, the interference cancellation may be performed in the following priority: PRACH, PUCCH, PUSCH. The actual mechanics of PUSCH cancellation are similar to the cancellation process for downlink data. For example, the PUSCH cancellation process involves interferer channel estimation, blind modulation detection, symbol or codeword level cancellation, and/or processes similar to downlink data (PDSCH) cancellation in the UE.

Figure 9:
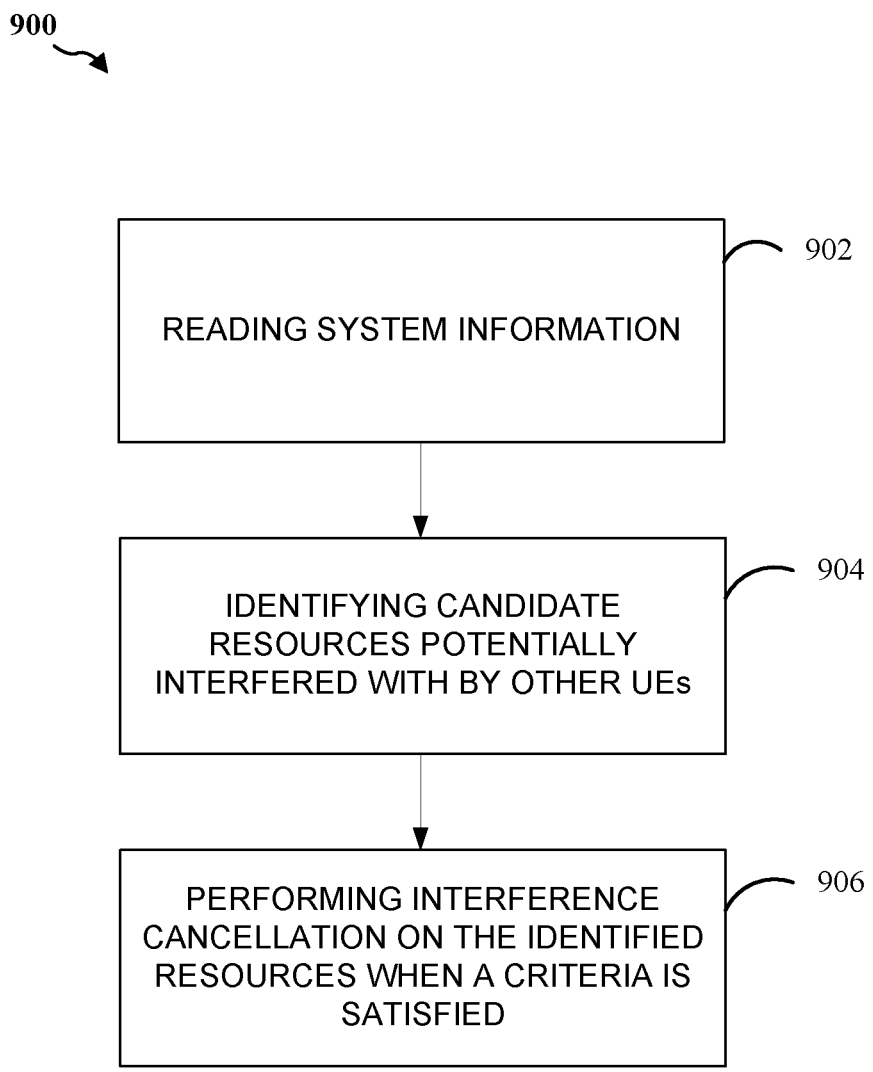
FIG. 9 is a block diagram illustrating a method for cancelling interference experienced by a victim UE from another UE.

FIG. 9 illustrates a method 900 for reducing interference. In block 902, a UE reads system information to determine potential interferences. In particular, the UE determines general network configurations of its own cell, the neighbor cell and/or adjacent channels. Each UE can read the neighbor cell and/or channel master and system information blocks. The UEs may also acquire additional information.

In block 904, the UE identifies candidate resources that are potentially interfered with by other UEs. In particular, the nature of the interference is classified. For example, the subframes may be classified as either downlink subframes or uplink subframes. The subframes that are problematic may then be identified.

In block 906, interference cancellation is performed on identified resources when a criteria is satisfied. For example, interference cancellation may be performed on identified resources when aggressor UE interference is detected. Additionally, the criteria may include consideration of the LTE uplink properties of the interfering signals of the candidate resource(s).

In one configuration, the UE 650 is configured for wireless communication including means for reading. In one aspect, the reading means may be the controller/processor 659 and/or the memory 660 configured to perform the functions recited by the reading means. The UE 650 is also configured to include a means for identifying. In one aspect, the identifying means may be the controller/processor 659 and/or memory 660 configured to perform the functions recited by the identifying means. The UE 650 is also configured to include a means for performing interference cancellation. In one aspect, the performing means may be the controller/processor 659 and/or the memory 660 configured to perform the functions recited by the performing means. In another aspect, the aforementioned means may be any module or any apparatus configured to perform the functions recited by the aforementioned means.

The above method was described with respect to a UE. In an alternate aspect, the eNodeB is configured to identify candidate resource potentially interfered with by UEs based on network configuration information. The eNodeB then performs interference cancellation on identified resources when a criteria is satisfied.

In one configuration, the eNodeB 610 is configured for wireless communication including means for reading. In one aspect, the reading means may be the controller/processor 675 and/or the memory 676 configured to perform the functions recited by the reading means. The eNodeB 610 is also configured to include a means for identifying. In one aspect, the identifying means may be the controller/processor 675 and/or memory 676 configured to perform the functions recited by the identifying means. The eNodeB 610 is also configured to include a means for performing interference cancellation. In one aspect, the performing means may be the controller/processor 675 and/or the memory 676 configured to perform the functions recited by the performing means. In another aspect, the aforementioned means may be any module or any apparatus configured to perform the functions recited by the aforementioned means.

Figure 10:
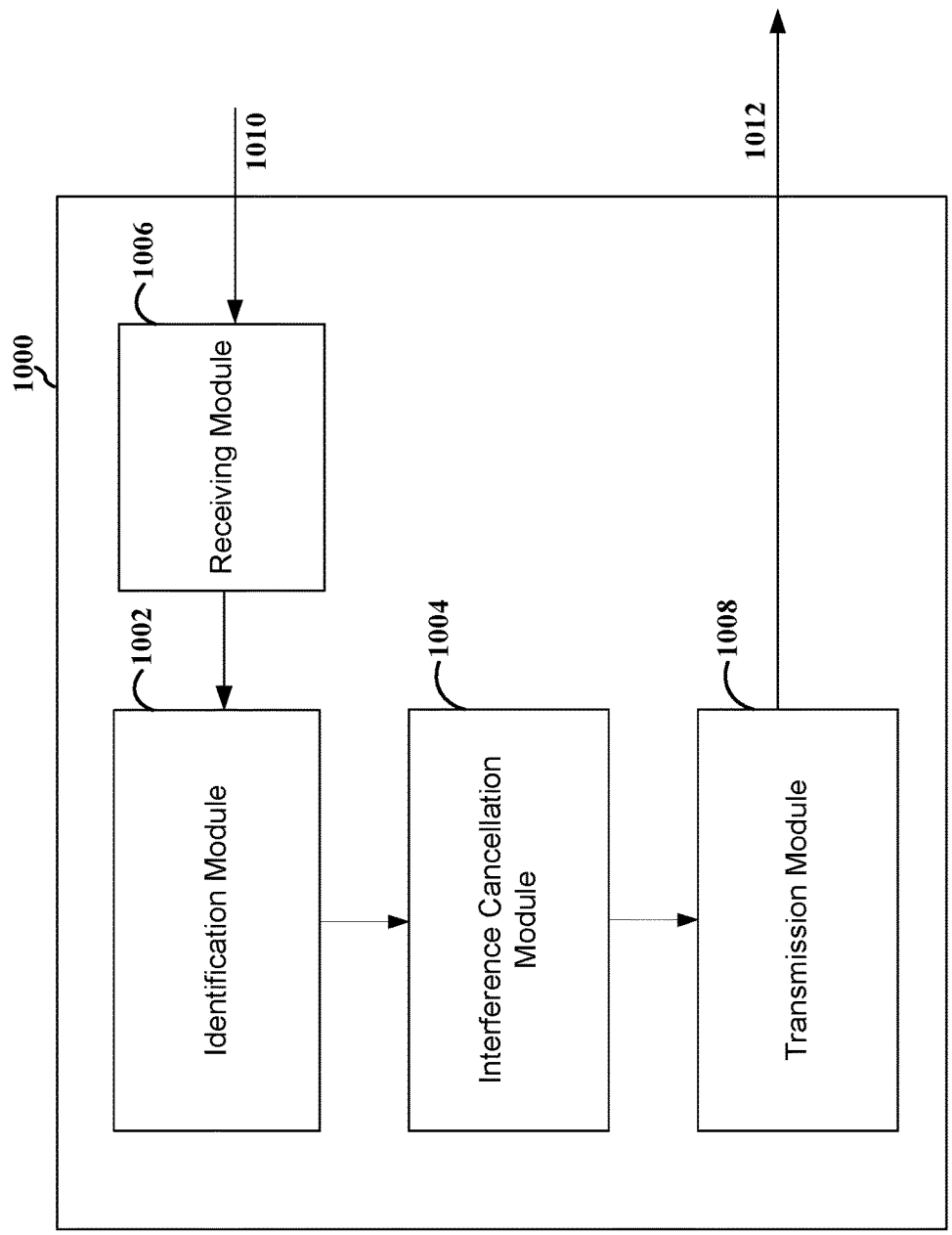
FIG. 10 is a conceptual data flow diagram illustrating the data flow between different modules/means/components in an exemplary apparatus.

FIG. 10 is a conceptual data flow diagram illustrating an exemplary data flow between different modules/means/components in an exemplary apparatus 1000. The apparatus 1000 includes an identification module 1002 and an interference cancellation module 1004. The identification module 1002 receives a signal 1010 from the receiving module 1006 that it uses to identify candidate resources potentially vulnerable to interference with other UEs. The interference cancellation module 1004 performs interference cancellation on the identified resources when a criteria is satisfied and the transmission module 1008 processes the signal without the interference and passes the processed signal on as signal 1012. The apparatus 1000 may include additional modules that perform each of the steps of the algorithm in the aforementioned flow chart FIG. 9. As such, each step in the aforementioned flow chart FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
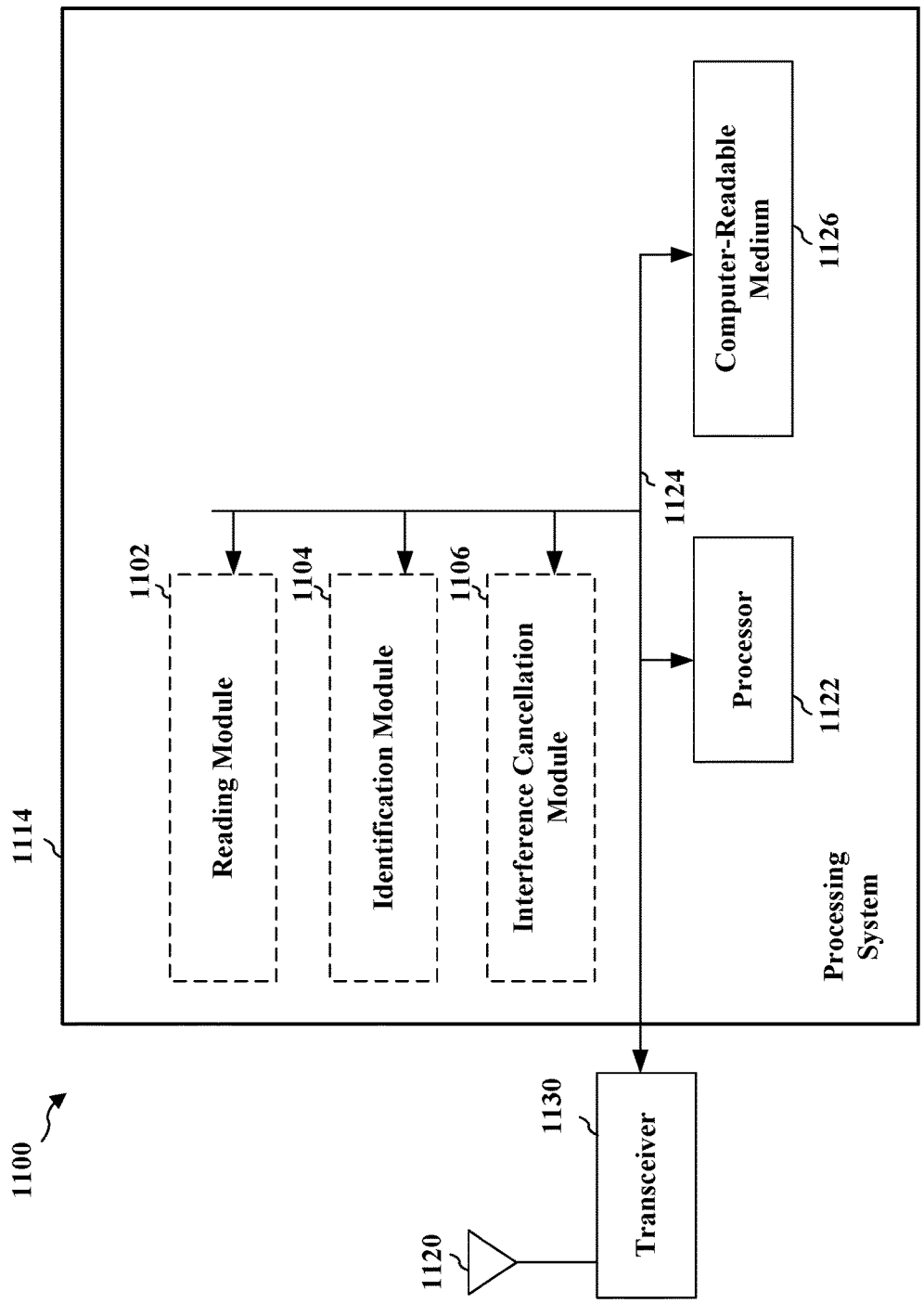
FIG. 11 is a block diagram illustrating different modules/means/components in an exemplary apparatus.

FIG. 11 is a diagram illustrating an example of a hardware implementation for an apparatus 1100 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1122 the modules 1102, 1104, 1106 and the computer-readable medium 1126. The bus 1124 may also link various other circuits such as timing sources, peripherals, voltage regulators, and power management circuits, which are well known in the art, and therefore, will not be described any further.

The apparatus includes a processing system 1114 coupled to a transceiver 1130. The transceiver 1130 is coupled to one or more antennas 1120. The transceiver 1130 enables communicating with various other apparatus over a transmission medium. The processing system 1114 includes a processor 1122 coupled to a computer-readable medium 1126. The processor 1122 is responsible for general processing, including the execution of software stored on the computer-readable medium 1126. The software, when executed by the processor 1122, causes the processing system 1114 to perform the various functions described for any particular apparatus. The computer-readable medium 1126 may also be used for storing data that is manipulated by the processor 1122 when executing software.

The processing system includes a reading module 1102, an identification module 1004 and an interference cancellation module 1104. The reading module 1102 is configured to read system information. The identification module 1104 is configured to identify candidate resources potentially interfered with by other UEs. The interference cancellation module 1106 performs interference cancellation on the identified resources when a criteria is satisfied. The modules may be software modules running in the processor 1122, resident/stored in the computer-readable medium 1126, one or more hardware modules coupled to the processor 1122, or some combination thereof. The processing system 1114 may be a component of the UE 650 or eNodeB 610.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
reading, at a user equipment (UE), a general network configuration of a neighboring cell to identify a time domain resource allocation of the neighboring cell, in which the UE is served by a serving cell that is different from the neighboring cell;
identifying, at the UE, at least one candidate resource potentially interfered with based on a comparison of the time domain resource allocation of the neighboring cell and a time domain resource allocation of the serving cell;
identifying, at the UE, at least one interfered resource from the at least one candidate resource by detecting uplink interference from at least one uplink resource of the neighboring cell on the at least one candidate resource based at least in part on an interference detection criteria; and
performing, at the UE, interference cancellation on the at least one uplink resource.

2. The method of claim 1, further comprising reading the general network configuration by acquiring time division duplex (TDD) subframe partition information.

3. The method of claim 1, further comprising reading the general network configuration by acquiring wide area network (WAN)-device to device (D2D) subframe partition information.

4. The method of claim 1, further comprising reading the general network configuration by acquiring at least one of a random access channel parameter, a control channel parameter, a cyclic prefix, or a combination thereof.

5. A user equipment (UE) configured for wireless communication, comprising:
a memory; and
at least one processor coupled to the memory, the at least one processor being configured:
to read a general network configuration of a neighboring cell to identify a time domain resource allocation of the neighboring cell, in which the UE is served by a serving cell that is different from the neighboring cell;
to identify at least one candidate resource potentially interfered with based on a comparison of the time domain resource allocation of the neighboring cell and a time domain resource allocation of the serving cell;
to identify at least one interfered resource from the at least one candidate resource by detecting uplink interference from at least one uplink resource of the neighboring cell on the at least one candidate resource based at least in part on an interference detection criteria; and
to perform interference cancellation on the at least one uplink resource.

6. The UE of claim 5, in which the at least one processor is further configured to read the general network configuration by acquiring time division duplex (TDD) subframe partition information.

7. The UE of claim 5, in which the at least one processor is further configured to read the general network configuration by acquiring wide area network (WAN)-device to device (D2D) subframe partition information.

8. The UE of claim 5, in which the at least one processor is further configured to read the general network configuration by acquiring at least one of a random access channel parameter, a control channel parameter, a cyclic prefix, or a combination thereof.

9. A non-transitory computer-readable medium having non-transitory program code recorded thereon for wireless communication, the program code comprising:
program code to read, at a user equipment (UE), a general network configuration of a neighboring cell to identify a time domain resource allocation of the neighboring cell, in which the UE is served by a serving cell that is different from the neighboring cell;
program code to identify, at the UE, at least one candidate resource potentially interfered with based on a comparison of the time domain resource allocation of the neighboring cell and a time domain resource allocation of the serving cell;
program code to identify, at the UE, at least one interfered resource from the at least one candidate resource by detecting uplink interference from at least one uplink resource of the neighboring cell on the at least one candidate resource based at least in part on an interference detection criteria; and
program code to perform, at the UE, interference cancellation on the at least one uplink resource.

10. The non-transitory computer-readable medium of claim 9, in which the program code to read the general network configuration comprises program code to acquire time division duplex (TDD) subframe partition information.

11. The non-transitory computer-readable medium of claim 9, in which the program code to read the general network configuration comprises program code to acquire wide area network (WAN)-device to device (D2D) subframe partition information.

12. The non-transitory computer-readable medium of claim 9, in which the program code to read the general network configuration comprises program code to acquire at least one of a random access channel parameter, a control channel parameter, a cyclic prefix, or a combination thereof.

13. An apparatus for wireless communication, comprising:
- means for reading, at a user equipment (UE), a general network configuration of a neighboring cell to identify a time domain resource allocation of the neighboring cell, in which the UE is served by a serving cell that is different from the neighboring cell;
- means for identifying, at the UE, at least one candidate resource potentially interfered with based on a comparison of the time domain resource allocation of the neighboring cell and a time domain resource allocation of the serving cell;
- means for identifying, at the UE, at least one interfered resource from the at least one candidate resource by detecting uplink interference from at least one uplink resource of the neighboring cell on the at least one candidate resource based at least in part on an interference detection criteria; and
- means for performing, at the UE, interference cancellation on the at least one uplink resource.

14. The apparatus of claim 13, in which the means for reading further comprises means for acquiring time division duplex (TDD) subframe partition information.

15. The apparatus of claim 13, in which the means for reading further comprises means for acquiring wide area network (WAN)-device to device (D2D) subframe partition information.

16. The apparatus of claim 13, in which the means for reading further comprises means for acquiring at least one of a random access channel parameter, a control channel parameter, a cyclic prefix, or a combination thereof.

* * * * *